Sept. 11, 1956     C. P. STANLEY ET AL     2,762,761
LIQUID CONTACTING APPARATUS WITH AUTOMATIC HEAT CONTROL
Original Filed Oct. 18, 1945     2 Sheets-Sheet 1

INVENTORS
CLYDE P. STANLEY
RICHARD W. WEEKS
BY
Hudson + Young
ATTORNEYS

Sept. 11, 1956     C. P. STANLEY ET AL     2,762,761
LIQUID CONTACTING APPARATUS WITH AUTOMATIC HEAT CONTROL
Original Filed Oct. 18, 1945     2 Sheets—Sheet 2

INVENTORS
CLYDE P. STANLEY
RICHARD W. WEEKS
BY
Hudson & Young
ATTORNEYS

United States Patent Office 2,762,761
Patented Sept. 11, 1956

2,762,761

LIQUID CONTACTING APPARATUS WITH AUTOMATIC HEAT CONTROL

Clyde P. Stanley, Tulsa, Okla., and Richard W. Weeks, Bedford Park, Ill., assignors to Phillips Petroleum Company, a corporation of Delaware Continuation of application Serial No. 623,148, October 18, 1945. This application February 28, 1952, Serial No. 274,024

2 Claims. (Cl. 202—160)

This invention relates to a method and apparatus for process control. In one of its more specific aspects it relates to a method and apparatus for liquid process control based upon specific gravity of the component liquids. In another specific aspect it relates to control of a fractionator.

In the fractionation of mixed hydrocarbon stocks the distillation range of a given fraction removed from the fractionator bottom or overhead is an approximate function of the temperature and pressure of the oil within the fractionator at the point of withdrawal. Likewise the boiling range of the contents of a given tray at a given pressure is more or less a function of the temperature on that tray. Thus by controlling a fractionator tray temperature and pressure the boiling range of material withdrawn from that tray may be made to remain uniform. In like manner, the boiling range of the uncondensed vapors passing from the top of a fractionator operating at a given pressure is approximately proportional to their temperature at their point of exit from the tower. End point of this vaporous material is also proportional to the vapor line temperature, that is, as vapor line temperature rises the end point of the material condensed from these vapors increases also.

Because of the relative ease of installation and operation of temperature indicating devices, fractionation processes have for many years been controlled by temperatures. Commercial temperature indicating instruments serve the industry well for this purpose as evidenced by their general use.

In petroleum fractionation, distillation ranges of gasoline and other oils may vary a few degrees or end points may vary somewhat without detrimental effects on finally blended products.

Thermocouples operate on the principle of generation of an electromotive force as a result of a difference of temperature between the two junctions of the assembly. The electromotive force generated by such elements is at best, very, very small.

Bourdon tube assemblies are frequently used for indicating temperatures. These tube assemblies consist of a gas filled bulb connected by a small diameter tube to a pressure responsive device. Upon a change of temperature of the gas filled bulb the pressure responsive device indicates a change of pressure. One to two degrees temperature change produces only a small pressure change in the tube.

The small electromotive force changes from thermocouples and small pressure changes in Bourdon tube assemblies resulting from small temperature changes are very difficult to utilize for control of certain industrial operations, such as distillation for separation of components having boiling points within a few degrees of each other.

In operations where one to two degrees temperature change is more or less immaterial, the above mentioned types of temperature indicators function satisfactorily. In other words temperature indicating instruments commercially available are sensitive only to relatively large temperature changes. Thus, for controlling distillations wherein temperature differences of 5° to 10° F. exist from tray to tray, the aforesaid apparatus serves very well. However, for the separation of two compounds having relatively close boiling points such temperature control equipment is entirely inadequate, for example, for the separation of normal heptane from methylcyclohexane. The former boils at 209.1° F. and the latter at 212° F. For the separation of two such compounds a fractionator having 50 to 60 trays is ordinarily used. A 60-tray vessel for such service has an average temperature differential of less than 0.1° F. from tray to tray. It is obvious, therefore, that an automatic control sensitive only to 1° F. should be expected to fail to control properly such a fractionation, and such has been found to be true.

We have found a method for controlling such close cut fractionations as the separation of normal hexane from methylcyclopentane. Our method depends on controlling the fractionator according to specific gravity or density of the materials being separated. We have found that when a sufficient difference in the densities or specific gravities of the compounds being separated by fractionation exists, our method and apparatus serves efficiently as a control for the separation.

For a separation herein mentioned in an exemplary manner, normal heptane having a specific gravity of about 0.684 at 60° F. and methylcyclohexane a specific gravity of 0.774 at 60° F. may be readily separated by fractional distillation when using our method and apparatus for controlling the distillation.

One object of our invention is to provide an apparatus for and a method of fractional distillation control based on specific gravity.

Another object of our invention is to provide an apparatus for and a method for the control of distillation operations for the separation of two components having relatively close normal boiling points wherein the components have dissimilar specific gravities.

Still another object of our invention is to provide an apparatus for and a method for the control of a fractionation operation using the specific gravity of material at a process point as a basis for control and an apparatus for carrying out this method.

Still another object of our invention is to devise an apparatus and to provide a method for utilizing the apparatus for liquid process control based upon differences in specific gravity of the liquids in process.

Still other objects and advantages of our invention will be apparent to those skilled in the art from a careful study of the following description and attached drawing which respectively describes and illustrates diagrammatically one form of apparatus in which the method of our invention may be practiced.

In the drawing, Figure 1 represents diagrammatically a form of apparatus useful for practicing the method of our invention.

The terms "density" and "specific gravity" are used herein more or less interchangeably. It is realized that they are truly not interchangeable: density may be defined as mass per unit volume at a given temperature while specific gravity is density at some temperature divided by the density of water at this same temperature. Since the density of water is nearly unity at temperatures near the temperature of maximum density of water, the difference between density and specific gravity is little. However, at temperatures farther removed from the temperature of the maximum density of water, the difference between the density and specific gravity becomes increasingly greater.

When working with two compounds at about the same temperature, the difference between the specific gravities of the two compounds is for all intents and purposes the same as the difference in their densities. Thus, it is more or less immaterial whether one term or the other is used throughout this specification. However, since the petroleum industry usually uses the term "specific gravity," that term will be used herein to cover both.

Figure 1:
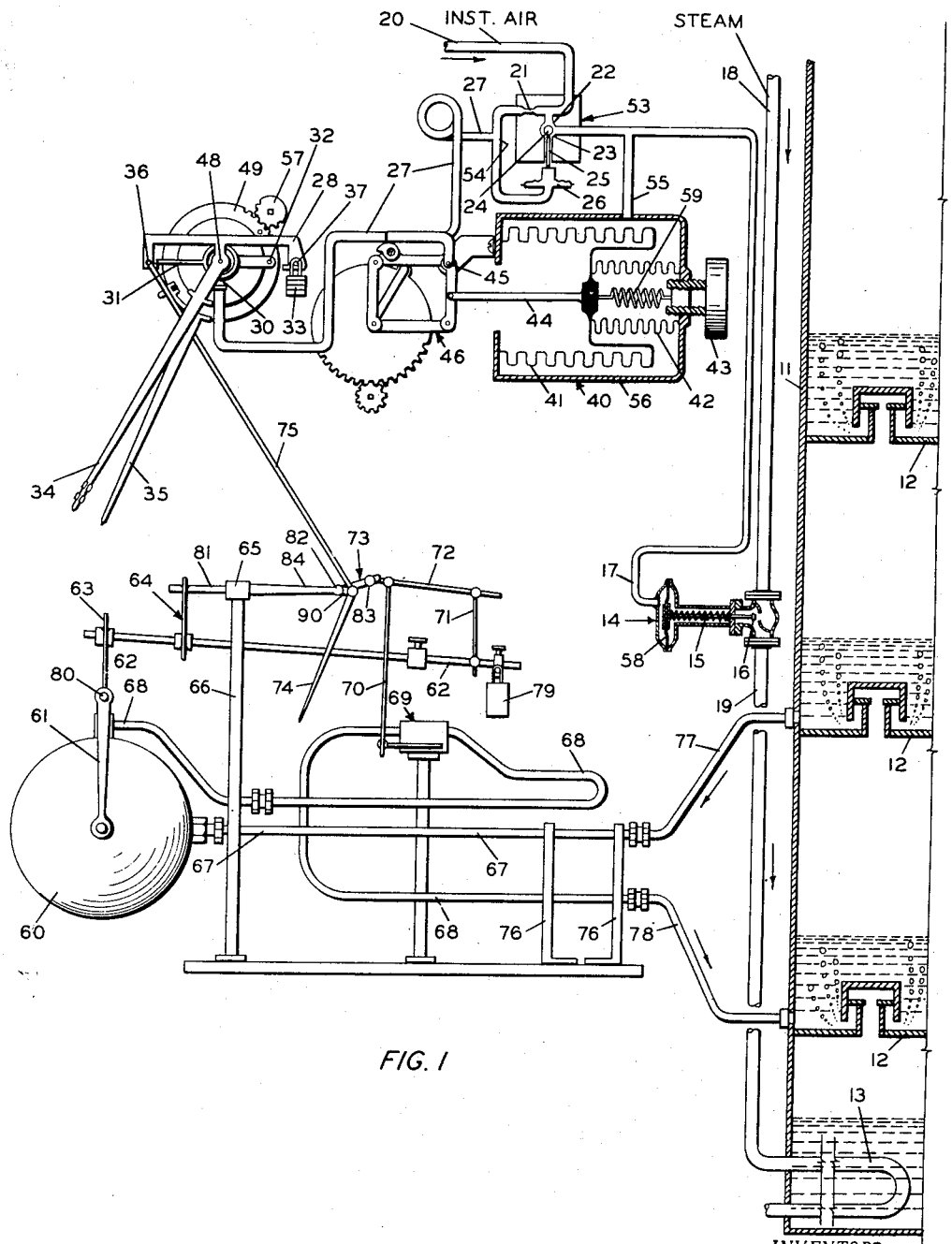

The gravitometer portion of the apparatus of Figure 1, as manufactured, actually determines the weight of a given volume of liquid. When such an apparatus is of the "recording" type, the recording is usually in terms of specific gravity, for convenience of the petroleum industry. Thus, the gravitometer determines density and records specific gravity.

The gravitometer portion of the apparatus illustrated in Figure 1 of the drawing is such as manufactured by the American Recording Chart Company, Los Angeles, California, and is termed by this manufacturer the Arcco-Anubis Liquid Gravitometer.

Figure 3:
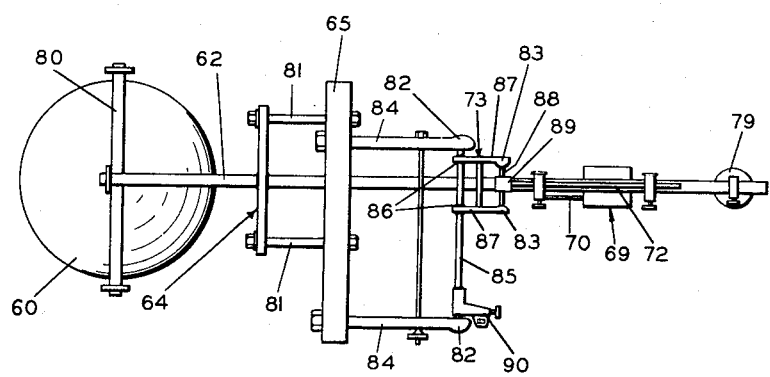
Figure 3 shows a plan view of a portion of the gravitometer apparatus illustrated in Figure 1.

The gravitometer as illustrated contains a bulb 60 which is filled with a liquid, the specific gravity of which is to be determined. This bulb is supported by some supporting links 61 wihch in turn are supported by a cross beam member 80. This latter member is supported by a knife link 63 which rests on a main beam member 62. On the opposite end of this main beam is a counter balance weight 79 which is intended to balance the bulb 60 on a main fulcrum assembly 64. This fulcrum assembly in turn is supported by two bars 81 which in turn are attached rigidly to a main cross bar 65. This main cross bar is mounted on top of two main posts 66. Connecting the main beam 62 and an indicating rod 72 is a main beam floating lever connection 71, as shown. Attached also to the indicating rod 72 is a thermostatic connecting rod 70 which imparts movements from a thermostatic temperature compensator 69 to the indicating rod 72. The indicating rod 72 is free to movement at a pivot point 83, thus both connecting rods 70 and 71 independently of each other, may impart vertical movement, either upwardly or downwardly to said indicating rod 72. These movements are permitted by a second pivot point 82. Two supporting rods 84 are rigidly attached to the main cross bar 65 as shown. The opposite ends of said supporting rods 84 terminate in the pivot points 82. The cross member 85 is a part of a pen arm driver assembly 73. Two side arms 87 of the pen driver assembly 73 are rigidly attached to the cross member 85 as illustrated in Figure 3 at points 86. The indicating rod 72 is free to move around a small pivot rod 88 as a center. A pen arm connection 90 extends beyond the end of one rigid support 84 and is rigidly attached to one end of the cross member 85 in such a manner that as the left hand end of the indicating rod 72 moves up or down the pivot 89, pivot rod 88 and pivot points 83 also move up or down. These latter members 88 and 83 in movement describe a circular arc around cross member 85 as a center. This movement rotates this cross member 85 which in turn imparts movement to the pen arm connection 90 and thence to pen arm 74.

This gravitometer apparatus may be of the type that the "pen arm" 74 is actually a recording pen adapted to making a permanent ink line on a chart or the "pen arm" 74 may be merely an indicator behind which may be arranged a chart graduated in specific gravity units for visual observation. It is ordinarily preferable to use a recording instrument. The motor driven charts of such recording instruments are old and are not shown in order to keep the drawings clear.

The liquid, the specific gravity of which it is desired to determine and to record, may originate on one tray of a fractionator column and be conducted therefrom through a line 77 and tube 67 into the bulb 60. When the bulb 60 fills, overflow liquid passes through an overflow tube 68, through the thermostatic temperature compensator 69 and thence through tube 78 back into the fractionator, on a lower tray. In the drawing it is shown that the tube 78 returns the liquid to the tray immediately below the takeoff tray. This liquid need not necessarily be returned to this first tray, but may be returned to a second or third or any other lower tray or to the reboiler section, or to such other disposal as desired. It will be obvious to those skilled in the art that the greater the vertical distance between points of takeoff and return the greater will be the static head for driving liquid through tubes 77 and 67, bulb 60 and return tubes 68 and 78. Of course the liquid could be returned to a higher tray or the same tray but then a pump would be needed in line 77 or 78. This gravitometer apparatus as manufactured by the hereinbefore mentioned company can operate on pressure differentials varying from approximately ½ pound to 3 pounds per square inch at a maximum pressure of about 500 pounds per square inch.

Supports 76 serve to hold the inlet and outlet tubes 67 and 68, respectively.

The thermostatic temperature compensator 69 operates in such a manner as to correct automatically the specific gravity of the liquid to 60° F. regardless of the temperature of the liquid passing through the bulb 60. In applicants' operation hydrocarbon liquid passes through the gravitometer portion of the apparatus at approximately 200° F. and automatic compensation to 60° F. is apparently quite satisfactory. This compensator apparatus is furnished as standard equipment on the hereinbefore mentioned gravitometer.

If desired, a permanent chart record may be made of the specific gravity of the liquid flowing through the bulb 60. For purposes of simplicity, the time clock for rotation of a circular chart is not shown, since a permanent record of specific gravity is not necessary for the operation of applicants' combined apparatus. However, the making of a permanent record is instructive and desirable for operational purposes.

The "control" portion of the apparatus, shown in Figure 1 of the drawing, may be substantially a "Fulscope Indicating Controller" apparatus manufactured by the Taylor Instrument Companies, Rochester, New York. A series of such types of apparatus is described in the Taylor Instrument Companies' descriptive bulletin entitled "Instructions for Taylor Fulscope Indicating Controller, Series 155R to 164R" and copyrighted in 1939.

In some instances other mechanical or electrical control apparatus known in the art may be substituted within the scope of this invention but we prefer the control apparatus shown.

Modification of this Fulscope apparatus was made to combine its operation with that of the hereinbefore discussed gravitometer.

In said bulletin several types of Fulscope controllers were illustrated and described, any of which can be used in conjunction with the gravitometer depending upon the type of operational controls desired.

For exemplary purposes, we will describe the Fulscope controller having "adjustable sensitivity, type 121R" and described in said bulletin on pages V-4 and V-5.

Such a Fulscope controller is normally used to control, for example, the flow of reflux to the top of a fractionation tower or to control the flow of steam to the reboiler section of a fractinator depending upon a temperature at some point in a process.

A Bourdon tube assembly 52 (Figure 2) consists of a bulb 29, a tube 47 and a spring 51, which assembly is a gas tight assembly adapted to coil or uncoil spring 51 as the temperature and therefore the gas pressure within the bulb 29 decreases or increases. This bulb 29 may be placed in a reboiler section of a fractionator or at any other desired control point when it is desired to control steam to the reboiler.

This Bourdon spring is attached to a connecting link 50 which transmits movement from the spring to a pivot member 38. Also attached to this pivot 38 is a moving arm member 28 which is pivoted at a center pivot 48. Behind and free from said pivots and the moving arm member is a wheel 49. A circular baffle member 31 pivots to this wheel at a pivot point 32 but is not pivoted nor attached in any manner to pivot point 48. This circular baffle is intended to touch or substantially to touch an air nozzle 30. The particular position of this circular baffle member with respect to the air nozzle 30 is intended to control air flow from the nozzle.

Figure 2:
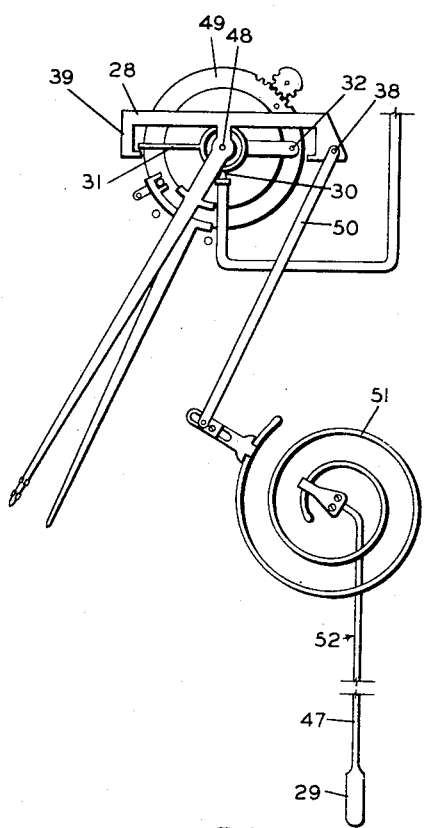
Figure 2 illustrates diagrammatically an older form of apparatus, in part, used in controlling fractional distillations.

According to our invention the Bourdon tube assembly 52 consisting of bulb 29, tube 47 and spring 51, and connecting link 50 are removed from the regular Fulscope controller, the connecting link 50 being detached from the pivot point 38. This pivot point 38 of Figure 2 corresponds to the pivot point 37 of Figure 1. To the pivot point 37 of Figure 1 is attached a counterbalance weight 33. In Figure 2 point 39 of the moving arm member is drilled to take a pivot and said pivot corresponds to pivot point 36 of Figure 1.

Connecting this latter pivot point 36 and the pen arm connection 90 of the gravitometer is a main connecting link 75.

This Fulscope apparatus is shown herein as connected to control steam coming from a source, not shown, through a steam line 18, through a valve 16 of a motor valve assembly 14, through a steam line 19 to a reboiler coil 13.

Instrument air from a source, not shown, enters our system through an air line 20 and enters a control block 53. This control block 53 is composed of an orifice 21, an upper relay valve seat 22, a lower relay valve seat 23, a relay valve ball 24, a pin 25, a capsular member 26 and an air tube 54. Air from the main air line 20 passes through the orifice 21, air tube 54 and tube 27 and out nozzle 30 when the circular baffle 31 is not touching the nozzle 30. When the circular baffle 31 touches the nozzle 30, that is, the nozzle is closed, air cannot flow from the nozzle to the atmosphere with the result that pressure in air tube 54 builds up. When this pressure in tube 54 builds up, the pressure is communicated to the capsular member 26 and the latter accordingly becomes inflated with the result that pin 25 and ball valve 24 rise, the latter touching the upper relay valve seat 22 and closing off the flow of air from air line 20 to an air tube 17. The latter communicates with the top of the diaphragm of the diaphragm motor valve 14 to decrease air pressure on the diaphragm and a tension spring 15 operates to unseat the valve 16.

Conversely, when the circular baffle member 31 is not in contact with the nozzle 30, air flows from tube 27 through the nozzle to the atmosphere. Accordingly, pressure in tube 54 drops resulting in deflation of capsular member 26 the movement of which permits pin 25 and ball 24 to fall against the lower seat 23 thereby opening passage from air line 20 to air tube 17 and thence pressure is communicated to the top of the valve diaphragm to close valve 16.

The opening and closing of valve 16 controls flow of steam to the reboiler steam coil 13 in the base of a fractionator column as in column 11.

The Fulscope controller herein described is intended to be of the "adjustable sensitivity" type. Accordingly the instrument is equipped with a sensitivity adjustment mechanism broadly identified by numeral 40. This mechanism includes a case 56, a bellows 41, a second bellows 42, an adjustment or synchronizing wheel 43, a push pin 44, a pivot 45, a parallelogram 46 and an air tube 55 connecting tube 17 with the case 56.

This adjustable sensitivity mechanism operates as follows: Assume the time lag and the capacity may be such that a sensitivity of 8 pounds per square inch must be used to stop "hunting" and that 10 pounds pressure on the diaphragm valve 16 passes sufficient steam to carry the reboiling heat load at equilibrium conditions of operation. Under such conditions the control points coincide with the set point at 10 pounds per square inch pressure. We will assume also that the controller is at equilibrium and that it is desired to decrease the set point specific gravity as indicated by pointer 35. By turning knob 57 clockwise rotates gear wheel 49 in the opposite direction and accordingly set pointer 35 since the latter is rigidly attached to the wheel 49. This movement of wheel 49 lifts the circular baffle pivot point 32 thereby raising baffle 31 away from nozzle 30. Air may now flow from the nozzle 30 and the decreased pressure in the capsular member 26 lowers the valve ball 24 toward the lower relay valve seat 23 allowing more air to flow from air line 20 past the valve ball 24 into air lines 17 and 55 thereby increasing the output pressure of the controller. This increased air pressure in lines 17 and 55 operates to close diaphragm valve 16 to retard the flow of steam and to increase the pressure in the space between bellows 41 and 42 and the case 56 and therefore pushing pin 44 to the left. The parallelogram 46 which pivots at point 45 transmits this motion to nozzle 30 moving it upward to follow the circular baffle 31 until the air flow from the nozzle is throttled by close proximity to the baffle. Since the set pointer 35 has been set anticlockwise from the pen pointer 34 and the controller is set in a sensitivity of 8 pounds per square inch, an increase in output pressure has occurred and the total output pressure is 10 pounds plus this increase, and this greater pressure tends to throttle the steam flow to the reboiler 13 through line 19.

A decreased steam flow through valve 16 due to the increased air pressure on the diaphragm 58 allows the process temperature to fall. In normal fractionating operation wherein a Bourdon spring and bulb assembly is used, this drop in process temperature is indicated by a contraction of Bourdon spring 51 (of Figure 2) which movement is transmitted to the moving arm member 28 so that this latter member rotates in a counterclockwise direction. This counterclockwise movement of arm member 28 allows the circular baffle member 31 to fall to a position closer to the nozzle 30 causing a throttling of the air escaping from the nozzle 30 and accordingly increases the air pressure in the air tube 27 which operates to decrease the output air pressure to the diaphragm 58 of the motor valve and to the bellows assembly. The decreased pressure in the bellows assembly lowers the parallelogram around pivot point 45 and causes nozzle 30 to drop as the baffle member descends. When the process temperature reaches the set point the controller output pressure is 10 pounds per square inch and the bellows parallelogram and nozzle are in their original position.

With this above-mentioned normal type of controller a load change may occur which requires a different amount of steam to maintain the control point and the pen member 34 will not coincide with the set pointer member 35. The synchronizing wheel 43 must then be adjusted. A counterclockwise turning of this wheel increases tension on a spring 59, which increased tension moves pin 44 to the right and lowers the nozzle 30 which movement accordingly increases the output pressure of the controller. Thus this synchronizing wheel affords a means of adjusting the controller to the proper output pressure and restoring the control point to the set point.

When applying such a Fulscope controller with Bourdon tube assembly to a distillation operation in which there are only 3° F. difference between the reboiler temperature and overhead temperature, the apparatus is not sufficiently sensitive to control the operation. In other words one degree F. change in reboiler temperature or one degree change in overhead or top tray temperature will throw such a system seriously out of balance. The Bourdon tube is not sufficiently sensitive to control such a close operation.

It was for this reason that applicants searched for other means as an indicator to use in combination with a Fulscope controller to control such a fine operation. Specific gravities can be utilized in place of temperature differentials when the specific gravities of two compounds being separated are sufficiently different. Such an example is the aforementioned mixture of normal heptane and methyl cyclohexane. The former boils at 209.1° F. and has a specific gravity of about 0.684 at 60° F. while the latter boils at 212° F. and has a specific gravity of 0.774 at 60° F. Applicants have found it very simple to control such a fractional distillation based on differences in specific gravity when the boiling points of the compounds being separated are close together.

Pure bottoms (methylcyclohexane) with a specific gravity of 0.774 and a top tray product (n-heptane) having a specific gravity of 0.684 gives a difference of 0.774—0.684=0.090. When the bulb 60 of Figure 1 of the drawing has a volume of 1000 cubic centimeters, the bulb will hold 774 grams of n-heptane or 684 grams of methylcyclohexane. A column used for such a separation will ordinarily contain upwards of 60 trays. Based on 60 trays the average specific gravity differential from tray to tray is .0015.

Such a gravitometer may be equipped with a chart showing a gravity range from 0.650 to 0.750. On such a chart there are 10 major divisions, each representing a specific gravity difference of 0.02. Each of these major divisions is in turn divided into 5 minor divisions, each representing a specific gravity change of 0.004. In operation, we have found it easily possible to control the 45th tray of a 60 tray column to within 0.002 specific gravity, which value is half that of a minor division and slightly more than the average difference in specific gravity per tray. This difference in specific gravity can be easily read on such a gravitometer chart.

For this example, that is, when substantially pure n-heptane is passing out as overhead vapor, the content of the 45th tray has a specific gravity of approximately 0.750. Feed in this case entered on the 31st tray and contained substantially only the two above mentioned hydrocarbons. Liquid was taken from this 45th tray and passed into the gravitometer bulb. The gravitometer was connected in a manner previously explained, in which connection the weight of the counterbalance member 33 was such as to balance the added weight of the link 75 connecting the gravitometer and the Fulscope instrument so that the pen arm will not have to support additional weight. The gravitometer is thus more sensitive to small specific gravity changes. In his example, also, the particular control instrument used, and the one frequently preferred is the "Fulscope adjustable sensitivity with automatic reset." By the use of this particular Fulscope instrument, the combined gravitometer—Fulscope controller is capable of controlling reboiler input steam under varying load and varying feed stock composition.

By the use of such a combination we have found it possible to control automatically the specific gravity on the 45th tray to within 0.002, which is one-half of a minor division and may be easily read on the chart. In this example the 45th tray control point gravity was 0.700. Thus, if this gravity changed 0.002 to 0.698 or to 0.702, there was a definite change in steam input to the kettle heating coil, and this change was maintained until the gravity on the chart changed. And either more or less steam was permitted to flow until the specific gravity on the 45th tray reached that of the control point gravity, 0.700, then as long as feed, composition and other conditions remained constant, the steam input and accordingly this 0.700 gravity remained constant.

In another example, a gravitometer was connected to a Fulscope controller of the type having adjustable sensitivity with automatic reset and installed to take liquid from the 50th tray of a 60 tray column. To the 31st tray was added 200,000 gallons per day of a feed stock of 59° A. P. I., gravity (0.7428 specific gravity) having the following composition: 15 vol. per cent n-heptane, 25 volume per cent methylcyclohexane, 35 volume per cent mixed isooctanes and 25 volume per cent n-octanes. The column was operated at about 25 pounds per square inch gage pressure, with a top temperature of 265° F. and a kettle temperature of 305° F. to produce a n-heptane concentrate overhead which has an A. P. I. gravity of 63° (specific gravity 0.7275), and a distillation range of I. B. P.—202° F., D. P.—208° F., and an isooctane and heavier kettle product of 57° A. P. I. (.7507 specific gravity) having a distillation range of I. B. P.—216° F., D. P.—232° F. The steam input to the reboiler heating coil was controlled by the above mentioned gravitometer-Fulscope combination which was continuously taking sample from the 50th tray. The gravity control point was 62° A. P. I. (.7313 specific gravity). The combined instrument controlled the specific gravity on this 50th tray to within a plus or minus 0.002, which variation permitted the average overhead product to be of the desired 63° A. P. I. gravity, A chart having a specific gravity range of .700 to .800 was used.

In making the connection between these two standard instruments, we have found that the connecting link 75 may be attached to either end of the moving arm member 28 of the Fulscope instrument. When the link 75 is attached at point 36, as shown in Figure 1, then the counterbalance 33 is attached to point 37 so that the moving arm member is free to rotate around the pivot point 48. In like manner, when link 75 is attached at point 37, then the counterweight will be suspended from point 36. The embodiment shown in the drawing is the assembly which we have used.

As mentioned hereinbefore, the magnitude of the counterweight need only be sufficient to balance the weight of the connecting link so that an added load will not be permanently supported by the pen arm connection 90 at which point the connecting link 75 joins the gravitometer.

While we have explained in detail the operation of the gravitometer instrument in conjunction with the Fulscope controller with adjustable sensitivity (type 121R), our invention is not limited to this particular combination. In the above mentioned Fulscope controller booklet of instructions are listed a total of five types of controllers. Any and all of these five controllers can equally well be operated in conjunction with the gravitometer as herein explained. These several types of Fulscope controllers merely do different control jobs in different manners, and such differences are independent of our type of connection between the controller and gravitometer. Also other mechanical or electrical controllers known to the art may be substituted but we do not prefer such other controllers.

While we have explained the combined instruments in connection with the control of reboiling heat to a fractionator tower for fractionating compounds having very close boiling points, we do not wish to be limited to this particular application. Our adaptation may be used to control addition of reflux to a column. Our adaptation may also be used to control reboil heat or reflux to a fractionating column fractionating materials having further separated boiling points, of course, provided a sufficient difference in specific gravity of the components exists. Our combined instrument may be applied to other problems than of distillation as, for example, the blending of two liquids having different specific gravities. Such an adaptation will include the passage of the blended material through the gravitometer bulb, the controller being set to vary the flow of one of the blending ingredients.

In like manner our invention may be applied to the operation of transfer pipelines wherein liquids having different specific gravities are transferred from one point to another in a common pipe. For example, the valve system controlling distribution of such oils as a gasoline base blending stock, a kerosene, a distillate, a natural gasoline, or liquid butane, from a common pipeline to their respective storage tanks may be operated according to an adaptation of our invention. Intermediate contaminated materials may similarly be diverted to a common slop tank, then as a material flowing through the gravitometer reaches a specific gravity characteristic of the pure stock, it can then be diverted to its storage tank, automatically.

In our explanation of differences of specific gravity, we have freely discussed the operation of the apparatus for separating two hydrocarbons having specific gravities of 0.774 and .684. The specific gravities of the two materials being distilled or blended need not be these particular values, nor they need not present this particular difference in specific gravity value, that is, 0.774−0.684=0.090. The difference may be more or even less and our method of control of such operations will still be highly satisfactory.

This application is a continuation of application Serial No. 623,148, filed October 18, 1945, and now abandoned.

It will be obvious to those skilled in the art that many variations in the apparatus and many applications of the principles herein disclosed may be made and yet remain within the intended spirit and scope of our invention.

We claim:

1. In a regulating system for a fractionating tower including a series of fractionating trays, a container for holding liquid to be vaporized, and a steam line for heating the liquids in said container, a fluid pressure actuated valve in said steam line for regulating the vaporization of liquid in said container thereby to change the specific gravity of liquids in said fractionating trays, a source of fluid for actuating said valve, weighing mechanism comprising a beam, a weight at one end of the beam, a liquid receptacle at the other end of the beam, and overflow means on said receptacle for maintaining a constant volume of liquid therein, a sample pipe connected to one of said series of fractionating trays and to said liquid receptacle, a second pipe connecting said overflow means to another of said series of fractionating trays so that said receptacle is continuously filled with liquid from a selected tray of said fractionating tower and whereby said beam tilts in response to changes in specific gravity of liquid in said receptacle, a conduit connecting said source of fluid and said valve, and a bleeder system for reducing the pressure in said conduit to actuate said valve, said bleeder system including a nozzle having an orifice and a movable baffle cooperating with said orifice, said baffle being operatively associated with said beam to vary the relation of the same with respect to said orifice.

2. In a regulating system for a contacting tower including a series of contacting zones, a container for holding liquids to be vaporized, and a steam line for heating the liquids in said container, a fluid pressure operated valve in said steam line for regulating the vaporization of liquid in said container thereby to change the specific gravity of liquids in said contacting zones, a source of fluid for actuating said valve, a liquid receptacle having overflow means thereon for maintaining a constant volume of liquid therein, weighing mechanism comprising a member connected to said receptacle and movable in accordance with changes in weight of said receptacle, a sample pipe connected to one of said contacting zones and to said liquid receptacle, a second pipe connecting said overflow means to another of said series of contacting zones so that said receptacle is continuously filled with liquid from a selected contacting zone and whereby said member moves in response to changes in specific gravity of liquid in said receptacle, a conduit connecting said source of fluid and said valve, and a bleeder system for reducing the pressure in said conduit to actuate said valve, said bleeder system including a nozzle having an orifice and a movable baffle cooperating with said orifice, said baffle being operatively associated with said member to vary the relation of the same with respect to said orifice.

References Cited in the file of this patent

UNITED STATES PATENTS

| | | |
|---|---|---|
| 1,944,243 | Kegl et al. | Jan. 23, 1934 |
| 2,009,711 | Mateer | July 30, 1935 |
| 2,176,741 | Kuhl | Oct. 17, 1939 |
| 2,251,771 | Wynn et al. | Aug. 5, 1941 |
| 2,297,361 | Mallory | Sept. 29, 1942 |
| 2,314,822 | Galainena | Mar. 23, 1943 |
| 2,321,175 | Binckley | June 8, 1943 |
| 2,361,885 | Tate et al. | Oct. 31, 1944 |
| 2,445,255 | Younkin | July 13, 1948 |
| 2,456,398 | Gerhold | Dec. 14, 1948 |
| 2,489,949 | Blair | Nov. 29, 1949 |

FOREIGN PATENTS

| | | |
|---|---|---|
| 839,703 | France | Dec. 11, 1937 |

OTHER REFERENCES

"Instruments and Process Control," pub. New York State Vocational and Practical Arts Association, 1945, pages 155–185.